United States Patent [19]

Beaverson et al.

[11] Patent Number: 5,746,062
[45] Date of Patent: May 5, 1998

[54] METHODS AND APPARATUSES FOR DETECTING SURGE IN CENTRIFUGAL COMPRESSORS

[75] Inventors: Gregory K. Beaverson; Harold R. Schnetzka, both of York; Timothy M. Frank, Wellsville, all of Pa.

[73] Assignee: York International Corporation, York, Pa.

[21] Appl. No.: 630,842

[22] Filed: Apr. 11, 1996

[51] Int. Cl.[6] ............................................ F25B 1/00
[52] U.S. Cl. .......................... 62/228.3; 62/129; 62/230
[58] Field of Search ............................ 62/217, 228.3, 62/228.4, 230, 129, 126

[56] References Cited

U.S. PATENT DOCUMENTS

| Re. 33,620 | 6/1991 | Persem . |
| 4,164,034 | 8/1979 | Glennon et al. . |
| 4,177,649 | 12/1979 | Venema .................... 62/228.4 X |
| 4,282,719 | 8/1981 | Kountz et al. . |
| 4,546,618 | 10/1985 | Kountz et al. . |
| 4,581,900 | 4/1986 | Lowe et al. . |
| 4,608,833 | 9/1986 | Kountz . |
| 4,653,280 | 3/1987 | Hansen et al. . |
| 4,810,943 | 3/1989 | Kawaguchi et al. . |
| 4,879,502 | 11/1989 | Endo et al. . |
| 5,123,080 | 6/1992 | Gillett et al. . |
| 5,126,642 | 6/1992 | Shahrodi . |
| 5,355,691 | 10/1994 | Sullivan et al. . |

FOREIGN PATENT DOCUMENTS 1-281353  11/1989  Japan .

Primary Examiner—Harry B. Tanner
Attorney, Agent, or Firm—Finnegan, Henderson, Farabow, Garrett & Dunner, L.L.P.

[57] ABSTRACT

A surge detection system for use in a fluid system having a load driven by a centrifugal compressor, the compressor being driven by an electric motor. The surge detection system comprises a means for sensing a differential pressure developed across the compressor and a means for sensing a current representing input power to the motor. The surge detection system further comprises a first computing means responsive to the differential pressure developed across the compressor for indicating when a valid surge is occurring in the compressor, and a second computing means responsive to the variable speed drive current for indicating when a valid surge is occurring in the compressor.

18 Claims, 9 Drawing Sheets

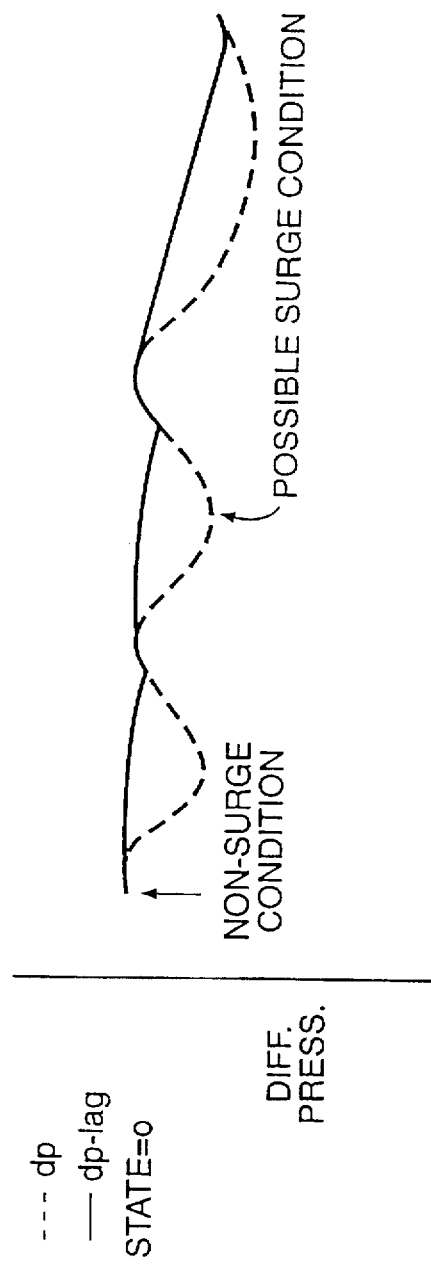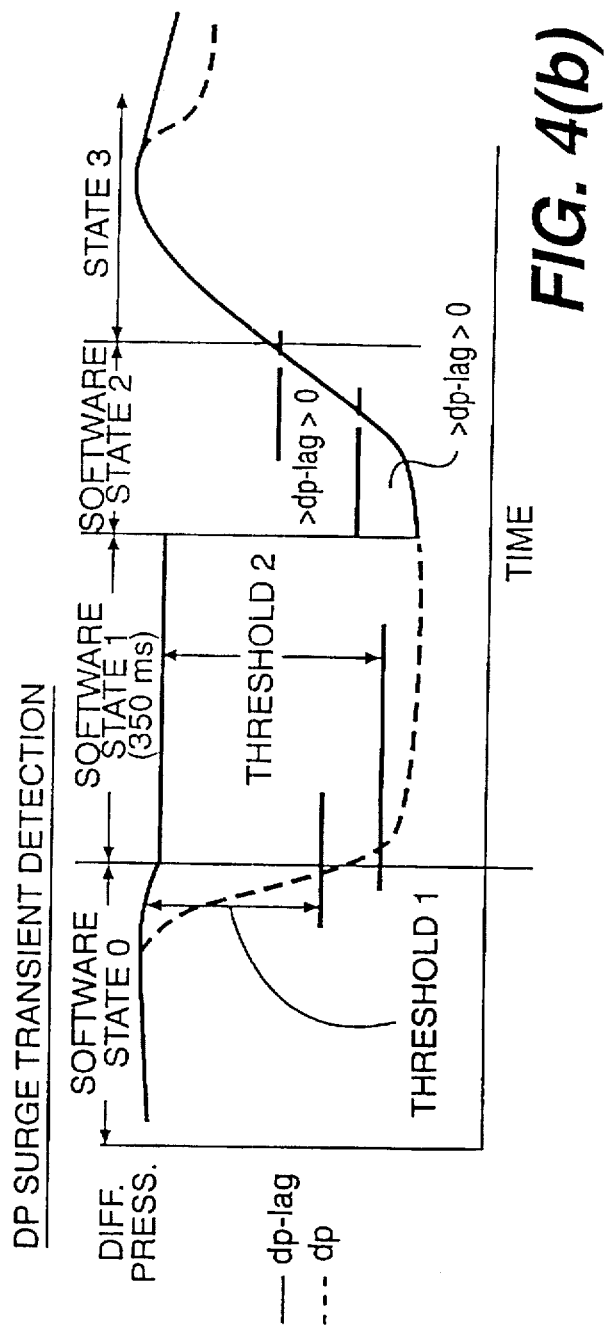

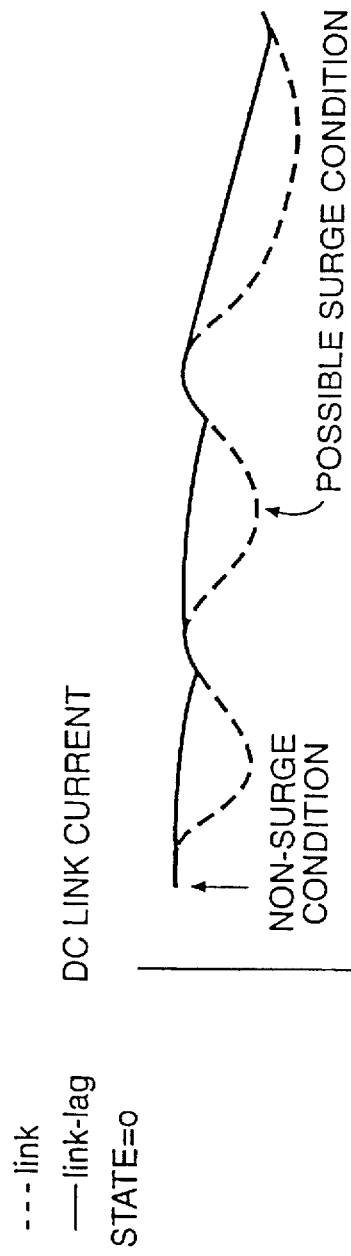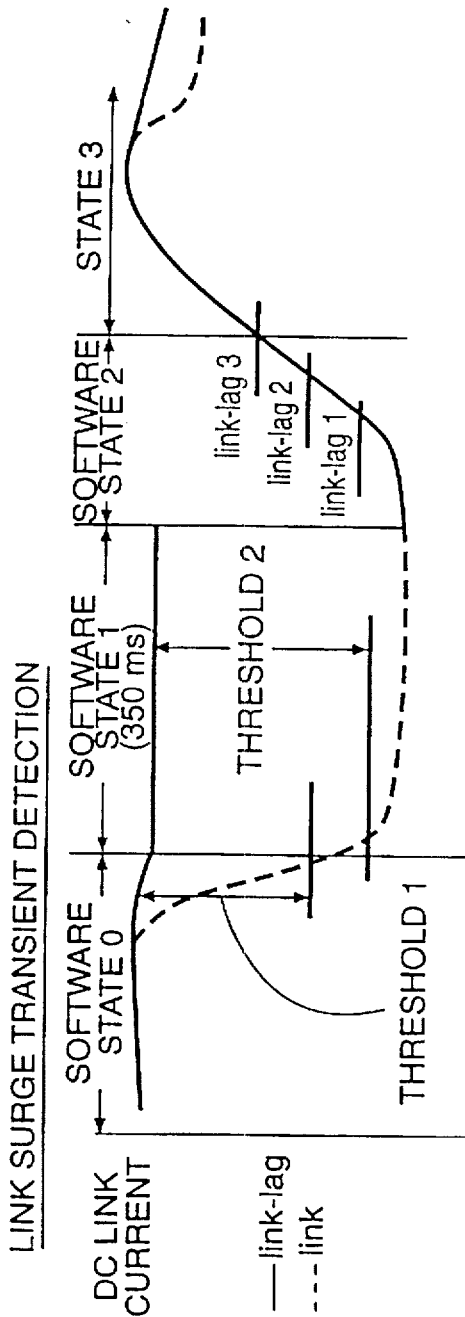

5,746,062

1

METHODS AND APPARATUSES FOR DETECTING SURGE IN CENTRIFUGAL COMPRESSORS

BACKGROUND OF THE INVENTION

1. Field of the Invention

The present invention relates generally to surge detection devices, and, more particularly, to methods and apparatuses for detecting surge in a compressor of a compressor-driven system, such as a refrigeration system.

2. Description of the Related Art

As is generally known, surge or surging is an unstable condition that may occur when compressors, such as centrifugal compressors, are operated at light loads and high pressure ratios. It is a transient phenomenon characterized by high frequency oscillations in pressures and flow, and, in some cases, the occurrences of a complete flow reversal through the compressor. Such surging, if uncontrolled, causes excessive vibrations in both the rotating and stationary components of the compressor, and may result in permanent compressor damage. In particular, at surge conditions there exists a momentary reduction in flow and pressure developed across the compressor. Further, there is a reduction in the net torque and mechanical power at the compressor driving shaft. In the case where the drive device is an electric motor, these oscillations in torque and power will cause oscillations in motor current and excessive electrical power consumption.

While a number of surge detection devices and systems have been utilized, there exists a need for an improved surge detection arrangement, particularly but not exclusively, for use in refrigeration systems having a centrifugal compressor driven by an electric motor.

SUMMARY OF THE INVENTION

Accordingly, the present invention is directed to improved methods and apparatuses for detecting surge in a compressor of a compressor-driven system by sensing the suction and discharge pressures of the compressor, or representative pressure of these values, and more particular, by reading the original value of these sensed parameters into a microprocessor and periodically sampling the magnitude of the pressure developed across the compressor. The present invention is further directed to an improved method and apparatus for detecting surge by sensing the magnitude of the current applied to a variable speed motor drive which drives the electric compressor motor, or a parameter representative of the input power to the motor and, more particularly, by applying that sensed current value, preferably a DC current, to a microprocessor that periodically samples that sensed parameter. In a preferred embodiment of the invention, the sensed parameters are periodically compared with earlier values and the microprocessor applies a preselected routine designed to determine when a surge condition exists. The preselected routine is designed for the particular compressor system to which the invention is applied and is divulged according to the principles described in this application.

The most preferred embodiment of the invention utilizes both the pressure sensing and the current sensing techniques, described herein, to detect a surge. When surge is detected in the refrigeration system, the system then changes the frequency of the drive supplied to the compressor motor, to eliminate or minimize any adverse consequences of the surge. It has been found that such a system substantially obviates one or more of the problems due to the limitations and disadvantages of the related art.

Additional features and advantages of the invention will be set forth in part in the description which follows, and in part will be apparent from the description, or may be learned by practice of the invention. The objectives and advantages of the invention will be realized and attained by the methods and apparatuses particularly pointed out in the written description and claims hereof as well as the appended drawings.

To achieve these and other advantages and, in accordance with the purpose of the invention, as embodied and broadly described herein, the invention comprises a surge detection system for use in a fluid system having a load driven by a centrifugal compressor, the compressor preferably being driven by an electric motor powered by a voltage source variable speed drive. In one embodiment, the surge detection system includes means for sensing a differential pressure developed across the compressor. In other embodiments, the system includes means for sensing a current representing an input power of the variable speed drive. In yet another embodiment, the system includes both such sensing means. The surge detection system further comprises a computing means responsive to the differential pressure change, and/or the sensed current, wherein the computing means periodically samples one or both of the sensed parameters and compares the sensed values with one or more predetermined thresholds in order to determine when a valid surge is occurring in the compressor.

In one aspect, the surge detection system includes means for sensing a condenser pressure and means for sensing an evaporator pressure. These sensed pressures are directly related to the discharge and suction pressures of the compressor. In that embodiment, a computing means is responsive to the condenser and evaporator pressures, periodically compares these pressures, performs a further periodically applied routine, and indicates when a valid surge is occurring in the compressor.

In still a further aspect, the invention includes a method for detecting surge in a refrigeration system having a centrifugal compressor driven by an electric motor powered by a voltage source variable speed drive and controlling the system to eliminate or minimize adverse conditions that can be caused by uncontrolled compressor surge. The method includes the steps of sensing a condenser pressure, sensing an evaporator pressure, sensing a current representing an output power of the variable speed drive, periodically sampling the sensed values to determine when a valid surge is occurring in the compressor, and applying a corrective control signal to the variable speed drive when a surge is detected. The method can be practiced so that it determines surge based on only the sensed values of pressures, or current, or it can be designed so that it will determine surge only when both the sensed pressures and sensed current values indicate that a surge is occurring.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, illustrate an embodiment of the invention and together with the description, serve to explain the principles of the invention.

BRIEF DESCRIPTION OF THE DRAWINGS

FIGS. 4(a), 4(b), 5(a) and 5(b) are graphical illustrations useful in understanding the principles of operation of the present invention in FIGS. 1-3.

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

It is to be distinctly understood at the outset that the present invention was developed for a refrigeration system and the control of such a system. However, while the association of the present invention with a refrigeration system represents its present preferred application, that disclosure is not intended to serve as a limitation upon the broad scope or teachings of the invention. The present invention likely has applications in other fields and apparatus since the invention pertains to a method and apparatus for detecting surge in a compressor of a compressor-driven system.

Figure 1:
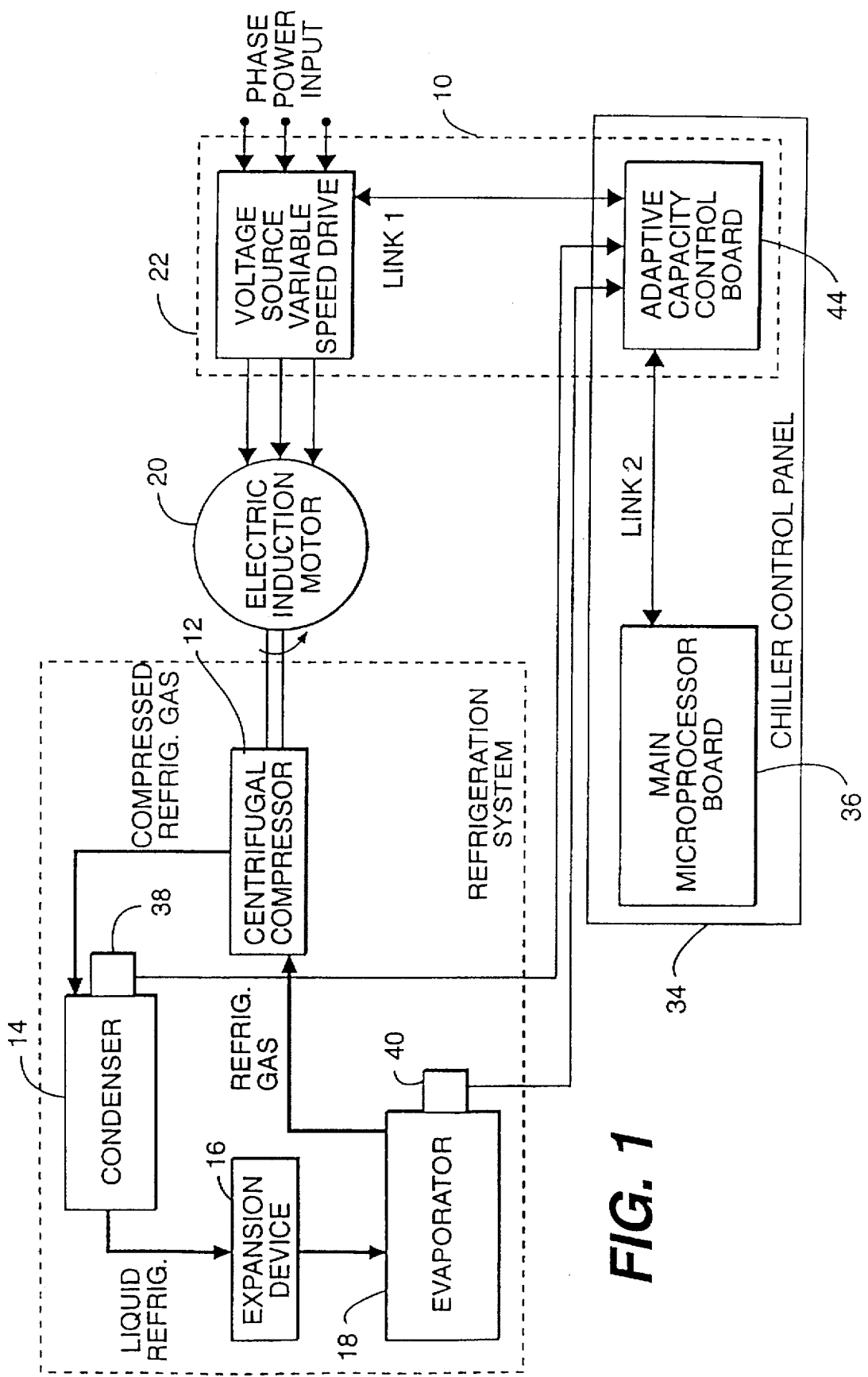
FIG. 1 is a block diagram of the a surge detection apparatus of the present invention for use in a refrigeration system having a centrifugal compressor driven by an electric motor powered by a voltage source variable speed drive.

The exemplary embodiment of the surge detection apparatus of the present invention, for use in a refrigeration or cooling system having a centrifugal compressor driven by an electric motor, is shown in FIG. 1 and is designated generally by reference numeral 10. The components of the refrigeration system and self-optimizing control system are the same as those disclosed in the teachings of U.S. Pat. No. 4,608,833 [hereinafter "the '833 patent"], which is assigned to the assignee of the present invention, and which is hereby incorporated by reference. The '833 patent illustrates and explains details of one such refrigeration system which can be adapted to utilize the surge detection apparatus disclosed herein.

In the '833 patent, the self-optimizing capacity control system is shown for inverter-driven centrifugal compressor based water chillers wherein adjustable inlet guide vanes and compressor speed are both automatically regulated in response to a continually updated "learned" chiller surge surface so as to realize minimum overall chiller energy consumption. In order to obtain the "learned" surge surface, the control system includes a microprocessor for initiating a "learning" mode in which the compressor motor speed is continually decreased incrementally and the pre-rotational guide vanes are moved to a more open position until an operating point is found where the compressor is surging.

For convenience of illustration of the present invention, the surge detection apparatus 10 is depicted in FIG. 1 in connection with a simplified version of a refrigeration system. The refrigeration system includes a centrifugal compressor 12, a condenser 14, an expansion device 16 and an evaporator 18, all being interconnected in series to form a conventional closed refrigeration circuit. Refrigerant gas is compressed in the compressor 12 and the compressed gas is delivered to the condenser 14 where a cooling medium, such as water from a cooling tower, causes the compressed gas to condense to a liquid refrigerant. The liquid refrigerant expands as it is passed through the expansion device 16 to the evaporator 18. As the liquid refrigerant flows through the evaporator 18, circulating water from a building is in a heat exchange relationship with the refrigerant so as to cause it to assume a vaporized state for delivery to a suction inlet of the compressor. In this manner, the water is chilled in the evaporator 18 for cooling the building. In order to vary the amount of cooling imparted to the building in response to changes in the cooling requirement or load, the capacity of the compressor 12 is adjusted by regulating the flow rate of the refrigerant through the refrigeration system to vary its capacity.

Figure 3:
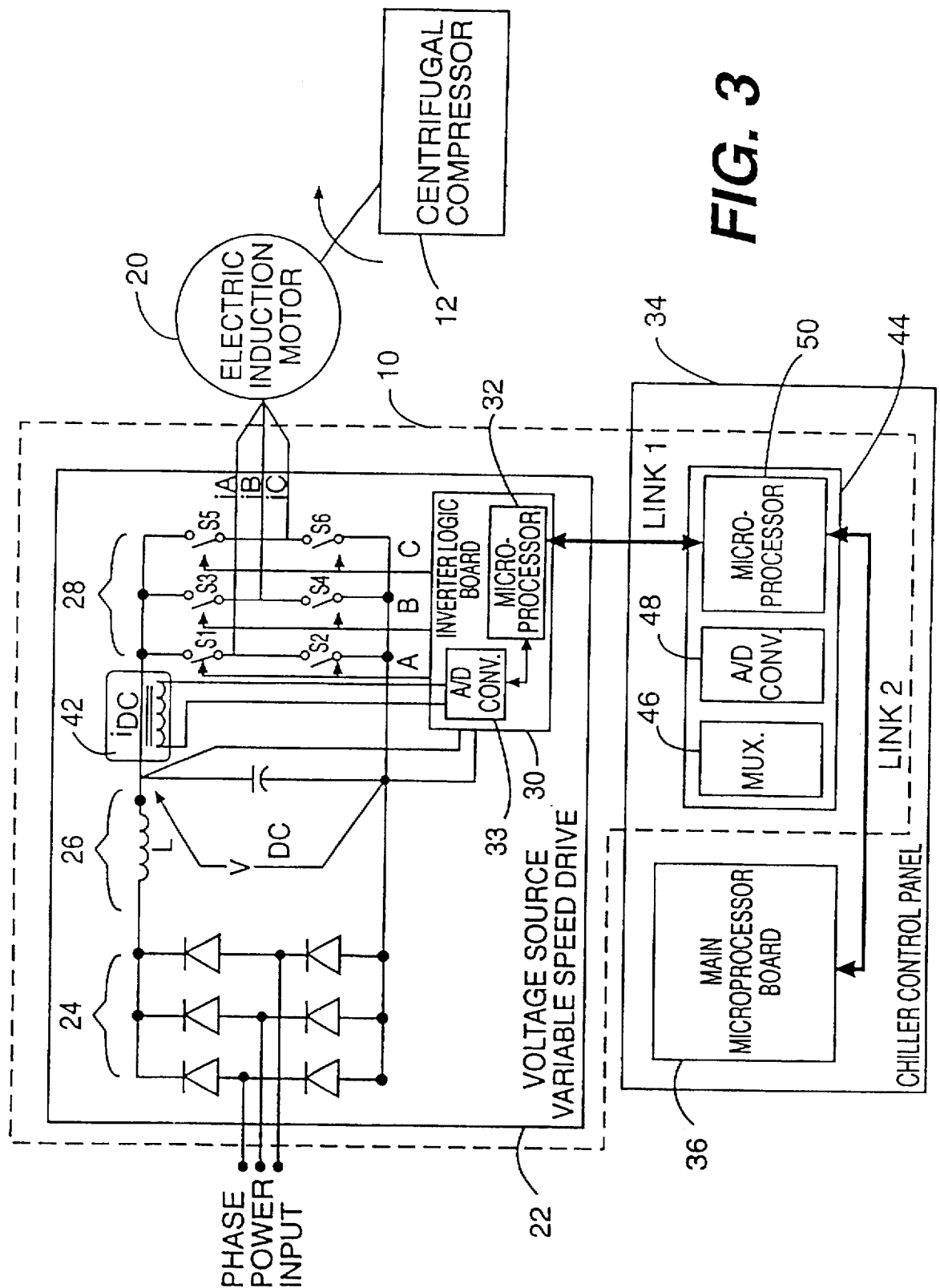
FIG. 3 is a more detailed block diagram illustrating the adaptive capacity control board, the voltage source variable speed drive, and the variable speed drive current input of FIG. 1.
Figure 6A:
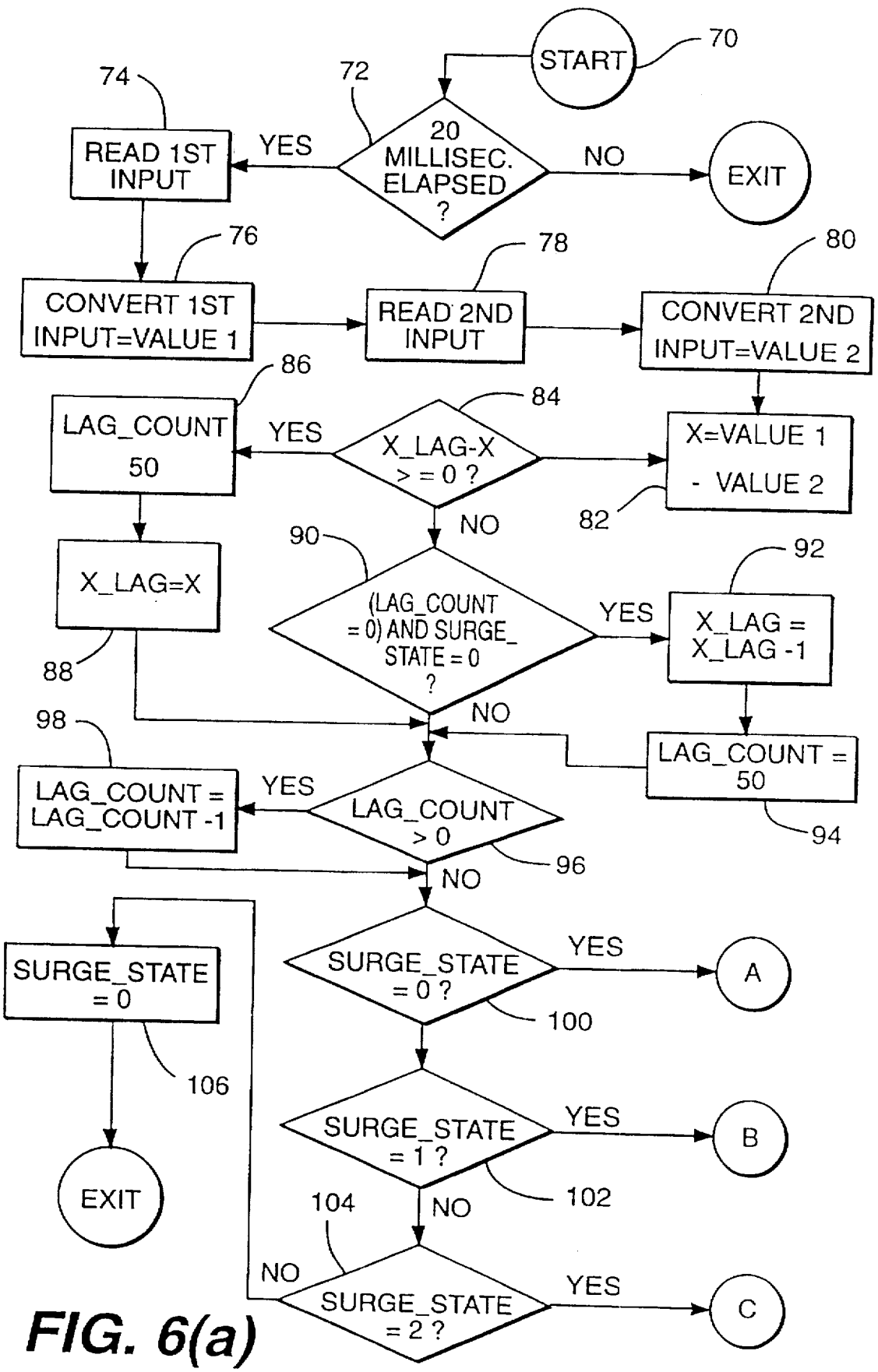
FIGS. 6(a)-(d) are more detailed diagrams illustrating the operations performed by the microprocessor of the adaptive capacity control board for the pressure inputs of FIG. 2 and for the current input of FIG. 3, by way of a flow chart.
Figure 6B:
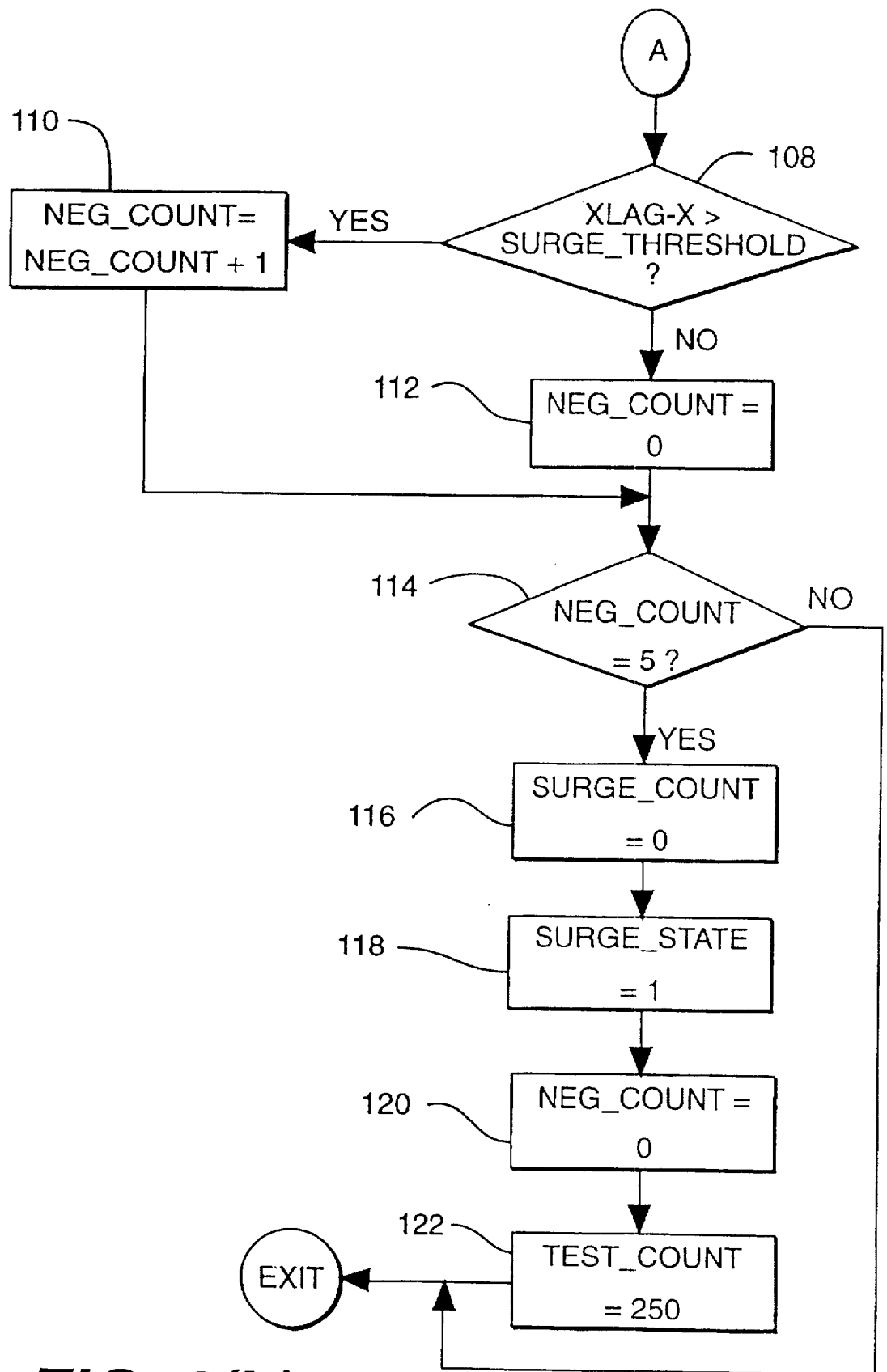
Figure 6C:
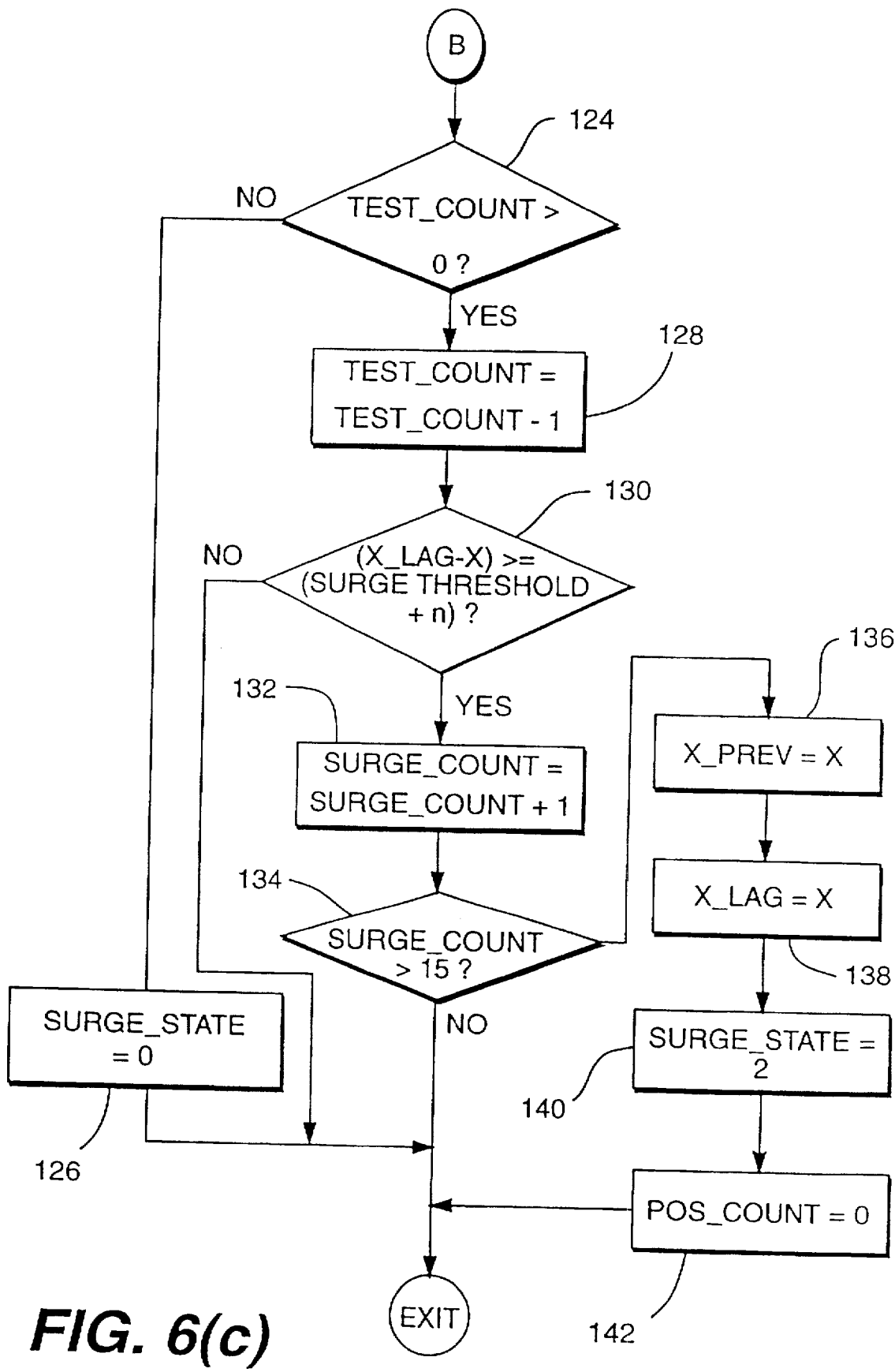
Figure 6D:
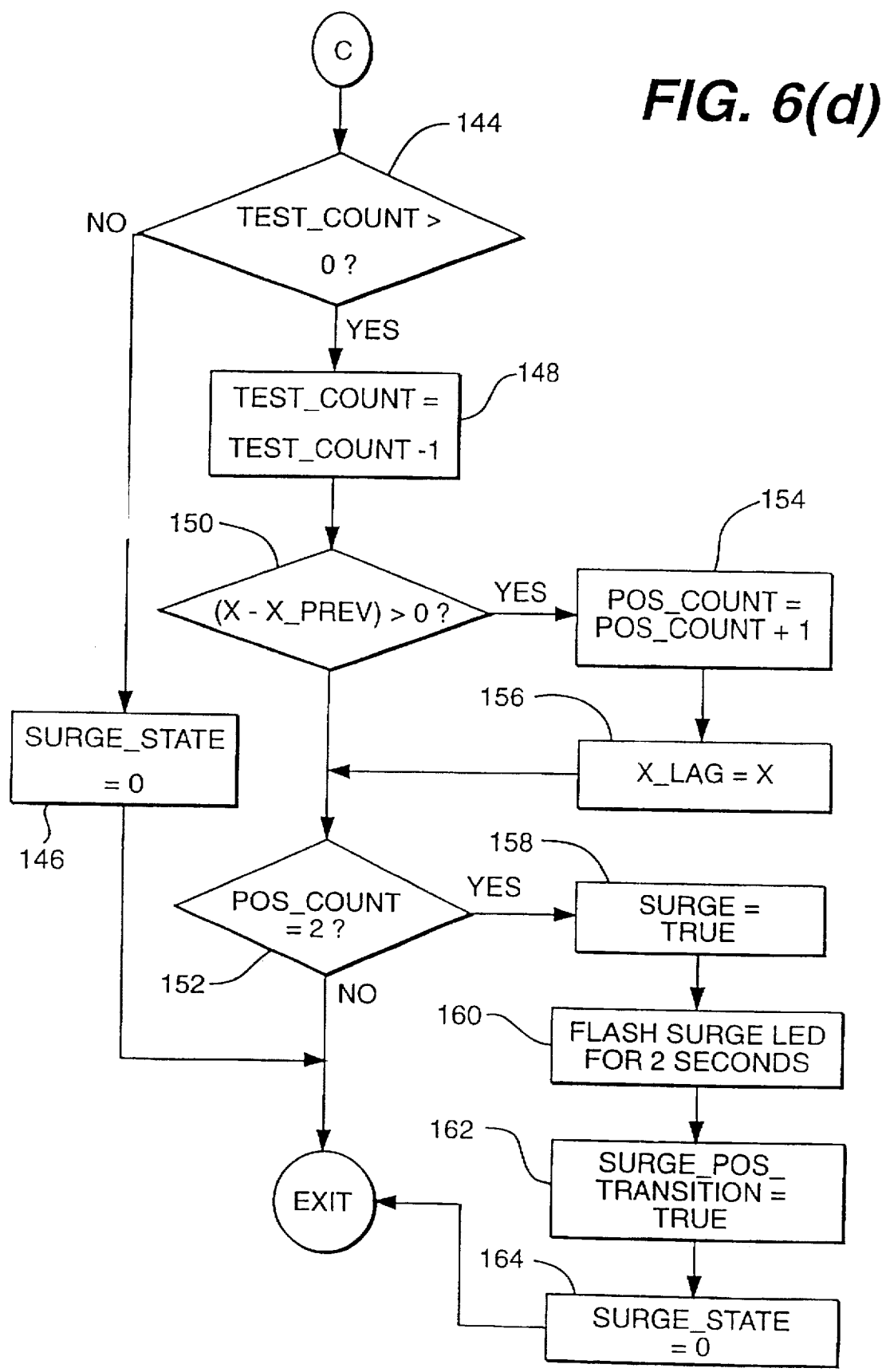

The refrigeration system of the present invention further includes a chiller control panel 34 having a main microprocessor board 36. An electric induction motor 20 powers the centrifugal compressor 12. The electric induction motor 20 is preferably driven by a voltage source variable speed drive 22. As shown in FIG. 3, the voltage source variable speed drive 22 preferably includes an AC to DC converter section 24, a low pass DC filter section 26 which smooths out a DC ripple, a DC to AC inverter section 28, and an inverter logic board 30 having a microprocessor 32 and an A/D converter 33.

It is generally known that a surge may cause permanent damage to the compressor if it is allowed to occur frequently and for long periods of time. Thus, in any application it is important to know when the compressor is surging. The surge detection apparatus 10 of the present invention will now be described in detail with reference to the refrigeration system of FIG. 1. Generally, the surge detection system 10 includes an adaptive capacity control board 44 which is provided within the chiller control panel 34 of the refrigeration system.

In particular, the surge detection system 10 includes a first pressure transducer 38 placed in the condenser 14 to produce a signal which is a function of either the absolute or gauge pressure in the condenser 14. A second pressure transducer 40 is placed in the evaporator 18 for producing a signal which is a function of either the absolute or gauge pressure in the evaporator 18. The transducers 38 and 40 could, in the alternative, be located in the respective discharge line and suction line of the compressor 12. In either event, the transducers will sense pressures that are representative of the discharge and suction pressure of the compressor 12.

It has been discovered that when surge in the compressor occurs, the discharge pressure (or pressure at the condenser) decreases and tends toward the suction pressure (or pressure at the evaporator). The present invention applies the actual pressures sensed by the two transducers to a microprocessor, where the sensed pressures are used to calculate a differential pressure which is periodically compared with delayed values to determine when a surge has occurred. In the preferred embodiment, these delayed values are periodically changed, depending upon a comparison of the difference between the sensed pressures and the then present delayed value. Through empirical and analytical efforts, a preferred routine has been developed to detect surge based on these broad principles. An example of a preferred routine developed for the system shown in FIG. 1 is described below, but the invention is not limited solely to that specific routine.

Figure 2:
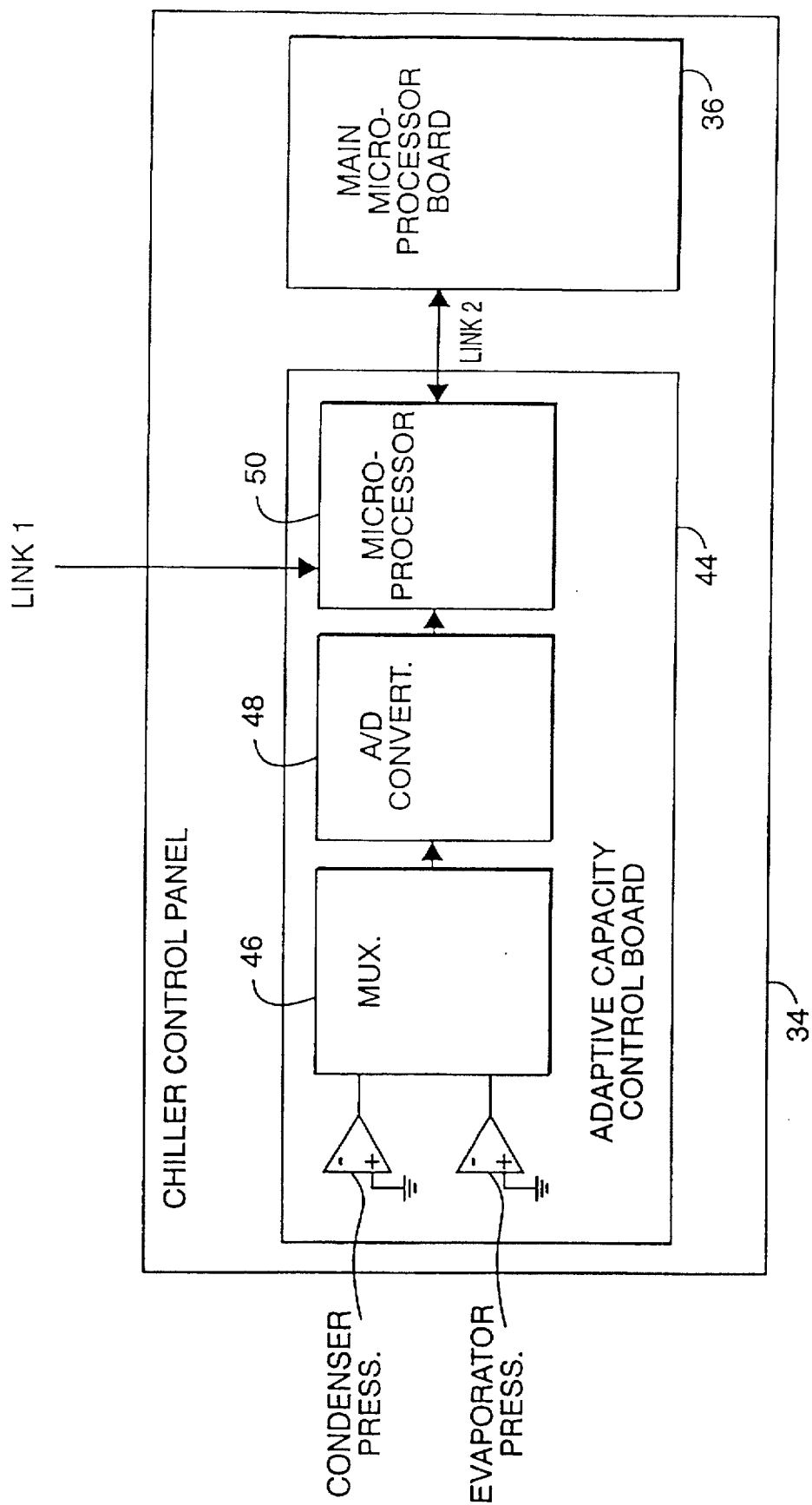
FIG. 2 is a more detailed block diagram illustrating the adaptive capacity control board and the pressure inputs of FIG. 1.

In the preferred embodiment, the adaptive capacity control board 44 is located within the chiller control panel 34, and is connected to the main microprocessor board 36 of the chiller control panel 34 and to the first and second pressure transducers 38, 40. As shown in FIG. 2, the adaptive capacity control board 44 includes a multiplexor 46 for receiving the condenser pressure and evaporator pressure signals in analog form and allowing each pressure signal to be output separately. Each pressure signal is then output to an A/D converter 48 for converting the selected pressure signals into digital signals which are finally output to a microprocessor 50. The microprocessor 50 receives the digital pressure signals, and periodically determines the difference between the condenser and evaporator pressure signals in order to produce a differential pressure value (dp). The microprocessor 50 periodically compares this differential pressure value with predicted control values and applies a routine designed to detect surge, based on the sensed pressures and threshold values generated through empirical and analytical efforts directed to the particular compressor and to the system to which it is attached. The operation of the microprocessor 50 of the preferred embodiment and routine is shown generally in FIG. 6 and is described below.

In order to provide an understanding of the operation of the preferred embodiment of the present invention, reference is now made to FIGS. 4(a) and 4(b). In FIG. 4(a), there is shown a typical measured differential pressure signal (dp) which appears in the compressor 12 which is fluctuating and may be representative of a surge event. The difference between the discharge and suction pressure remains relatively constant when no surge is occurring. In FIG. 4(a) a dp_lag value, which represents a variable created by the microprocessor 50 of the adaptive capacity control board 44, is used to detect surge and is automatically set equal to dp if dp exceeds dp_lag. If dp drops below dp_lag, then dp_lag is preferably lowered toward dp at a preselected rate, one working rate being 0.1 psi per second. This rate may vary depending on the application. As shown in FIG. 4(a), it has been discovered that this variable lags relatively close if not equal to the actual dp values, when no surge is occurring.

FIG. 4(b) depicts a typical measured differential pressure signal during a valid surge event, as well as how the microprocessor 50 adjusts the dp_lag variable. As shown in FIG. 4(b), the preferred embodiment of the routine requires four conditions to be met in order for the change in the differential pressure to qualify a valid surge. Two occur in what has been arbitrarily designated software state zero, at least one condition occurs in a software state one, and one occurs in a software state two. The first and second conditions are met (in software state zero) when the value (dp_lag-dp) exceeds a preselected threshold [threshold 1 in FIG. 4(b)] which indicates that a negative transition has occurred on dp. In the preferred embodiment applied to the refrigeration system of FIG. 1, this value must then remain below the threshold continuously for at least a preselected time (preferably 100 milliseconds) to qualify as the second condition. When these two conditions are met, a five second timer (the timer may vary from two to ten seconds, depending on the application) is set and the microprocessor automatically enters into software state one.

The third condition continuously samples subsequent dp signals, after the first and second conditions are met, in software state one. In the present preferred embodiment, the dp signals of the third condition are met in software state one when the value (dp_lag-dp) exceeds a second preselected threshold [threshold 2 in FIG. 4(b)] for at least 340 milliseconds. The time period that threshold 2 is to be exceeded may vary considerably from application to application. For systems like that shown in FIG. 1, the time period may vary from 200 to 750 milliseconds depending upon the type of system. If the dp signals of the third condition are met, the microprocessor automatically enters software state two, and dp_lag is set equal to dp. By means of example, threshold 1 is preferably 0.5 psi on low pressure compressors and 3.4 psi on high pressure compressors. The threshold may vary depending on the application. In the preferred embodiment, threshold 2 preferably is ten to twenty percent greater than threshold 1.

The fourth condition requires further sampling of the dp signal, after the first through third conditions are met. The dp signal of the fourth condition meets the requirements of software state two when at least two successive positive transitions [Δdp_lag>0, see FIG. 4(b)] are detected. If the third and fourth conditions are not met within a preselected time period (in the preferred embodiment, five seconds), software state zero is automatically re-entered and the process starts over again. Also, by setting the dp_lag to dp when the third condition is met, the dp_lag is automatically re-armed for the next surge event. If the four conditions are satisfied within the five second time interval, a valid surge is acknowledged.

The details of a computing device, such as the microprocessor 50 of the adaptive capacity control board 44, required to perform the functions just described with respect to the operation of FIGS. 4(a) and 4(b) is shown in FIGS. 6(a)–(d) in a flow chart fashion. The microprocessor 50 receives as input signals the condenser and evaporator pressure signals.

The surge identification process is initiated by a start block 70 which causes the reading of the input signals from the pressure transducers 38, 40. A logic or decision block 72 determines whether a 20 millisecond time period has elapsed since the last values were read. If 20 milliseconds have not expired, then the routine is exited. Otherwise, block 74 is entered to read the first input from the pressure transducer 38 attached to the condenser 14, and block 76 is entered to convert the first input value into "value 1." The second input from the pressure transducer 40 is then read and converted into "value 2" in blocks 78 and 80, respectively. The input values "values 1 and 2" are digital signals. Thus, in the conversion process, the microprocessor 50, searches a lookup table to correlate the digital values "values 1 and 2" with a corresponding pressure value times ten, i.e., the pressure values stored in the lookup table are 10× the actual values of the pressure.

The second value "value 2" is then subtracted from the first value "value 1" to obtain "x" ("x" represents the differential pressure dp) in decision or logic block 82. If the value of "x" subtracted from variable "x_lag" is positive, decision block 84 proceeds to counter block 86, in which a "lag_count" is set equal to fifty counts, and then to block 88 in which the variable "x_lag" is set equal to "x." One count is equal to twenty milliseconds, thus, fifty counts is equal to one-thousand milliseconds or one second. If the value of "x" subtracted from variable "x_lag" is negative, decision or logic block 84 proceeds to decision or logic block 90 in which it is determined whether the "lag_count" is equal to zero and whether the "surge_state" is equal to zero. If both conditions of decision block 90 are true, then "x_lag" is decremented by one unit in block 92, the "lag_count" is reset to fifty counts (1000 milliseconds or 1 second) in block 94, and decision or logic block 96 is entered. The units in this application are equal to 0.1 psi per second, as stated above. In other words, the "x_lag" is actually decremented by 0.1 psi per second.

If both conditions are not satisfied in decision block 90, then decision block 96 is entered where it is determined whether the "lag_count" is greater than zero. If the "lag_count" is greater than zero, then the "lag_count" is decremented by one count (20 milliseconds) in block 98, otherwise decision or logic block 100 is entered. If the "surge_state" is determined to be equal to zero in decision block 100, then the routine branches to subroutine A, otherwise, the routine continues to decision or logic block 102. If the "surge_state" is determined to be equal to one in decision block 102, then the routine branches to subroutine B, otherwise, the routine continues to decision or logic block 104. If the "surge_state" is determined to be equal to two in decision block 104, then the routine branches to subroutine C, otherwise, the routine continues to set the "surge_state" equal to zero in block 106 and then exits.

In subroutine A, decision or logic block 108 determines whether "x_lag" less "x" is greater than a "surge_threshold," i.e., threshold 1 in FIG. 4(b). If the "surge_threshold" is exceeded, the subroutine proceeds to block 110 where "neg_count" is incremented by one count (20 milliseconds), otherwise the "neg_count" is set equal to zero in block 112. After block 112, the subroutine proceeds to decision or logic block 114 in which it is determined whether or not the "neg_count" is equal to five counts (100 milliseconds). If "neg_count" is not equal to five counts the subroutine is exited, otherwise, "surge_count" is set equal to zero in block 116, "surge_state" is set equal to one in block 118, "neg_count is set equal to zero in block 120, and "test_count" is set equal to "250," i.e., five seconds (250×20 milliseconds=5 seconds) in block 122. After block 122, the subroutine is exited.

In subroutine B, a decision block 124 is entered to see if "test_count" is greater than zero. If "test_count" is not greater than zero, "surge_state" is set to zero in block 126 and the subroutine is exited, otherwise, "test_count" is decremented by one count (20 milliseconds) in block 128 and decision or logic block 130 is entered. In decision block 130, if "x_lag" less "x" is less than or equal to "surge_threshold+n", (i.e., threshold 2 in FIG. 4(b), with "surge_threshold" representing threshold 1 in FIG. 4(b) and "n" representing ten to twenty percent of threshold 1) then the subroutine is exited, otherwise, "surge_count" is incremented by one count (20 milliseconds) and decision or logic block 134 is entered. In decision block 134, if "surge_count" is less than or equal to fifteen counts (300 milliseconds), then the subroutine is exited, otherwise, "x_prev" and "x_lag" are set equal to "x" in blocks 136 and 138, respectively, "surge_state" is set equal to two in block 140, "pos_count" is set equal to zero in block 142, and the subroutine is exited.

In subroutine C, decision or logic block 144 determines if "test_count" is greater than zero. If "test_count" is not greater than zero, then "surge_state" is set equal to zero in block 146 and the subroutine is exited, otherwise, "test_count" is decremented by one count (20 milliseconds) in block 148 and decision or logic block 150 is entered. In decision block 150, if "x" less "x_prev" is less than or equal to zero, then decision block 152 is entered, otherwise, "pos_count" is incremented by one count (20 milliseconds) in block 154 and "x_lag" is set equal to "x" in block 156. If "pos_count" is determined to be not equal to two counts (40 milliseconds) in decision block 152, then the subroutine is exited, otherwise, a surge is identified in block 158, a surge LED is flashed in block 160, "surge_pos_transition" is set equal to "true" in block 162, "surge_state" is reset to zero in block 164, and the subroutine is exited.

When a surge is detected, the microprocessor 50 of the adaptive capacity control board 44 generates a control signal via "link 1" (see FIG. 1) to increase the frequency supplied by the voltage source variable speed drive 22. The increase in frequency in the voltage source variable speed drive 22 increases the electric motor speed, which in turn increases the rotational speed of the compressor 12, thus preventing another surge from occurring in the compressor 12. Such control techniques are outlined in the '833 patent incorporated by reference above.

In an alternative embodiment, as shown in FIG. 3, the surge detection system 10 may include a DC current transformer 42, or plurality thereof, located in between the DC filter section 26 and the DC to AC inverter section 28 of the voltage source variable speed drive 22 for directly sensing an output DC link current $i_{DC}$ of the DC filter section 26. The average value of the DC link current $i_{DC}$ is preferably reconstructed using three phases of motor current $i_A$, $i_B$ and $i_C$ supplied by the DC to AC inverter section 28 of the voltage source variable speed drive 22 and three output switch command signals A, B and C supplied by the inverter logic board 30 to switches S1–S6 of the DC to AC inverter section 28. The average value of the DC link current $i_{DC}$ is indicative of the power delivered by the DC filter section 26, since the DC voltage $V_{DC}$ generated by DC filter section 26 is constant, and the power delivered by the DC filter section 26 is calculated by multiplying the DC voltage $V_{DC}$ by the DC link current $i_{DC}$.

As seen in FIG. 3, the adaptive capacity control board 44 is connected, via serial "link 2," to the main microprocessor board 36 of the chiller control panel 34 and to the inverter logic board 30, via serial "link 1," of the voltage source variable speed drive 22. The main microprocessor board 36 provides control for other stages of the chiller as well as digital display read-out of the chiller operating conditions. The variable speed drive's inverter logic board 30 includes an A/D converter 33 for converting the average value of the DC link current signal $i_{DC}$ into a digital signal, and a microprocessor 32 for receiving the digital representation of the average value of the DC link current signal $i_{DC}$. The variable speed drive inverter logic board 30 may process the DC link current $i_{DC}$ directly and send a surge flag to the adaptive capacity control board 44 during a surge event via "link 1." Alternatively, the inverter logic board 30 may send the digital value of the DC link current $i_{DC}$, via "link 1," and permit the microprocessor 50 of the adaptive capacity control board 44 to process the DC link current $i_{DC}$ in order to determine surge. Thus, in an alternative embodiment, the present invention, may preferably detect a surge event by utilizing the detected DC link current $i_{DC}$.

In order to provide an understanding of the operation of the alternative embodiment of the present invention, reference is now made to FIGS. 5(a) and 5(b). In FIG. 5(a) of the drawings, there is illustrated graphically a typical measured average value of the DC link current (designated as "ilnk") which appears in the voltage source variable speed drive 22 and has fluctuations which may be representative of a surge event. Also shown in FIG. 5(a) is a ilnk_lag value which represents a variable created by the microprocessor 50 or 32 of the adaptive capacity control board 44 or the variable speed drive inverter logic board 30, respectively. The variable ilnk_lag is automatically set equal to ilnk if ilnk exceeds ilnk_lag. If ilnk drops below ilnk_lag, then ilnk_lag is slowly lowered toward ilnk at a rate of ten least significant bits (LSBs) per second. The A/D converter 33 of the inverter logic board 30 has twelve bits or a total of $2^{12}$ (=4096) LSBs. The rate ilnk_lag is lowered may vary depending on the application. FIG. 5(b) depicts a typical measured DC link current signal (ilnk) during a valid surge event, as well as how the microprocessor 50 or 32 adjust the ilnk_lag variable.

In accordance with the DC link current $i_{DC}$ surge detection method, the conditions listed above for the differential pressure surge detection method, must also be satisfied for the DC link current surge detection method. Thus, the DC link current surge detection method is analogous to the differential pressure surge detection method. However, the sensed value of the DC link current (not the dp value) is used. Furthermore, the DC link current surge detection method's third condition requires the value (ilnk_lag-ilnk) to exceed a second threshold [threshold 2 in FIG. 5(b)] for at least 350 milliseconds, rather than 340 milliseconds. The time period that threshold 2 is to be exceeded may vary from 200 to 750 milliseconds, depending upon the application. Furthermore, the DC link current surge detection method's fourth condition requires at least three successive positive transitions [Δilnk_lag>0, see FIG. 5(b)] to be detected, rather than two.

Further in accordance with the DC link current surge detection method, the microprocessor 50 or 32 of the adaptive capacity control board 44 or inverter logic board 30, respectively, follows the same surge identification process of FIGS. 6(a)–(d) as was described above for the differential pressure surge detection method. However, in the DC link current surge detection method the "x" should be replaced with "ilnk," and 10 milliseconds should be used in place of 20 milliseconds as shown decision block 72 of FIG. 6(a). This means that in the DC link current surge detection method, one count is equal to ten milliseconds, rather than twenty milliseconds. Furthermore, in the DC link current surge detection method, the microprocessor 50 or 32 does not read and convert a second input [blocks 78 and 80 of FIG. 6(a)], since the microprocessor 50 or 32 only reads in one input, i.e., the DC link current $i_{DC}$. Thus, the microprocessor 50 or 32 does not subtract "value 2" from "value 1" in block 82 of FIG. 6(a), but only sets "x" equal to "value 1." Also, the DC link current surge detection method lowers "ilnk_lag" toward "ilnk" at a rate of ten LSBs per second.

In light of the above embodiments, various combinations of the surge detection system can be devised. For example, surge may be detected by sensing pressure change across the compressor 12 only, by sensing DC link current $i_{DC}$ in the voltage source variable speed drive 22 only, or by sensing pressure change across the compressor 12 and/or DC link current $i_{DC}$ in the voltage source variable speed drive 22. In the present preferred embodiment, both the pressure and the current models are used to detect surge and surge may be indicated if one or both routines determine usage.

It will be apparent to those skilled in the art that various modifications and variations can be made in the surge detection method and apparatus of the present invention and in construction of this method and apparatus without departing from the scope or spirit of the invention. As an example, the DC link current method can be performed by the microprocessor 32 contained in the inverter logic board 30 of the voltage source variable speed drive 22, thus eliminating the need for the adaptive capacity control board 10. Furthermore, the compressor 12 need not necessarily be of the centrifugal-type, but may also be any other type of rotodynamic compressor.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A surge detection system for use in fluid system having a load driven by a centrifugal compressor, the compressor being driven by an electric motor, the system comprising:
   means for sensing a differential pressure developed across the compressor;
   means for sensing a current representing an input power to the motor;
   first computing means responsive to the magnitude of said differential pressure developed across the compressor for indicating when a valid surge is occurring in the compressor; and
   second computing means responsive to the magnitude of said sensed current for indicating when a valid surge is occurring in the compressor.

2. A surge detection system as claimed in claim 1, wherein said differential pressure sensing means comprises first and second pressure transducers.

3. A surge detection system as claimed in claim 2, wherein said current sensing means comprises at least one current transformer.

4. A surge detection system as claimed in claim 3, wherein said first computing means computes the difference between the pressure sensed by said first and second pressure transducers to obtain a differential pressure, compares the differential pressure against both first and second differential pressure thresholds, and indicates that a valid surge is occurring in the compressor when the first and second differential pressure thresholds are both exceeded within first and second predetermined time periods, respectively, and wherein said second computing means compares the magnitude of said sensed current against both first and second variable speed drive current thresholds, and indicates that a valid surge is occurring in the compressor when the first and second variable speed drive current thresholds are both exceeded within third and fourth predetermined time periods, respectively.

5. A surge detection system as claimed in claim 4, wherein the system indicates that a valid surge condition occurred in the compressor only when said first and second computing means both indicate that a valid surge condition is occurring.

6. A surge detection system for use in a refrigeration system having a centrifugal compressor driven by an electric motor, the electric motor being driven by a voltage source variable speed drive, the system comprising:
   means for sensing a pressure representative of the suction pressure of the compressor;
   means for sensing a pressure representative of the discharge pressure of the compressor;
   means for sensing a current of the voltage source variable speed drive, said current representing an input power to the motor;
   first computing means responsive to the magnitude of said sensed pressures for indicating when a valid surge is occurring in the compressor; and
   second computing means responsive to the magnitude of said sensed current for indicating when a valid surge is occurring in the compressor.

7. A surge detection system as claimed in claim 6, wherein said suction pressure sensing means comprises a first pressure transducer.

8. A surge detection system as claimed in claim 7, wherein said discharge pressure sensing means comprises a second pressure transducer.

9. A surge detection system as claimed in claim 8, wherein said current sensing means comprises at least one current transformer.

10. A surge detection system as claimed in claim 6, wherein said first computing means computes the difference between said discharge pressure and said suction pressure to obtain a differential pressure, compares the differential pressure against both first and second differential pressure thresholds, and indicates that a valid surge is occurring in the compressor when the first and second differential pressure thresholds are both exceeded within first and second predetermined time periods, respectively, and wherein said second computing means compares said voltage source variable speed drive current against both first and second voltage source variable speed drive current thresholds, and indicates that a valid surge is occurring in the compressor when the first and second variable speed drive current thresholds are both exceeded within third and fourth predetermined time periods, respectively.

11. A surge detection system as claimed in claim 10, wherein the system indicates that a valid surge condition occurs in the compressor only when said first and second computing means both indicate that a valid surge condition is occurring.

12. A surge detection system for use in a refrigeration system having a compressor driven by an electric motor, the electric motor being driven by a voltage source variable speed drive, the system comprising:

means for sensing a differential pressure developed across the compressor, wherein said differential pressure sensing means includes means for sensing a pressure representative of the suction pressure of the compressor and means for sensing a pressure representative of the discharge pressure of the compressor; and computing means responsive to said sensed differential pressure for indicating when valid surge is occurring in the compressor, wherein said computing means computes the difference between said discharge pressure and said suction pressure to obtain a differential pressure, compares the differential pressure against both first and second differential pressure thresholds, and indicates that a valid surge is occurring in the compressor when the first and second differential pressure thresholds are both exceeded within first and second predetermined time periods, respectively.

13. A surge detection system as claimed in claim 12, wherein said computing means periodically samples the sensed differential pressure and compares the sensed values with one or more predetermined thresholds in order to determine when a valid surge is occurring.

14. A surge detection system as claimed in claim 12, wherein said compressor is a centrifugal compressor connected with an evaporator and a condenser and wherein said differential pressure sensing means senses the pressures at the evaporator and the condenser, respectively.

15. A method for detecting surge in a refrigeration system having a centrifugal compressor driven by an electric motor, the electric motor being driven by a voltage source variable speed drive, and a condenser and evaporator connected to the compressor, comprising the steps of:

sensing a condenser pressure;

sensing an evaporator pressure;

sensing a current of the voltage source variable speed drive representing an input power to the motor; and indicating when a valid surge is occurring in the compressor in response to one of the magnitude of said voltage source variable speed drive current and the magnitude of the difference between said condenser pressure and said evaporator pressure.

16. A method for detecting surge as claimed in claim 15, further comprising the steps of:

computing the difference between the condenser pressure and the evaporator pressure to obtain a differential pressure;

comparing the differential pressure against both first and second differential pressure thresholds; and indicating that a valid surge is occurring in the compressor when the first and second differential pressure thresholds are both exceeded within first and second predetermined time periods, respectively.

17. A method for detecting surge as claimed in claim 15, further comprising the steps of:

comparing the variable speed drive current against both first and second variable speed drive current thresholds; and indicating that a valid surge is occurring in the compressor when the first and second variable speed drive current thresholds are both exceeded within first and second predetermined time periods, respectively.

18. A method for detecting surge as claimed in claim 15, further comprising the steps of:

computing the difference between the condenser pressure and the evaporator pressure to obtain a differential pressure;

comparing the differential pressure against both first and second differential pressure thresholds;

comparing the variable speed drive current against both first and second variable speed drive current thresholds; and indicating that a valid surge is occurring in the compressor when, the first and second differential pressure thresholds are both exceeded within first and second predetermined time periods, respectively, and the first and second variable speed drive current thresholds are both exceeded within third and fourth predetermined time periods, respectively.

* * * * *

UNITED STATES PATENT AND TRADEMARK OFFICE
CERTIFICATE OF CORRECTION

PATENT NO.: 5,746,062

DATED: May 5, 1998

INVENTOR(S): Gregory K. BEAVERSON, et al.

It is certified that an error appears in the above-identified patent and that said Letters Patent is hereby corrected as shown below:

In Claim 1, Col. 10, line 2, before "fluid", insert --a--.

In Claim 12, Col. 11, line 33, before "valid," insert --a--.

Signed and Sealed this

Twenty-first Day of July, 1998

Attest:

BRUCE LEHMAN

Attesting Officer

Commissioner of Patents and Trademarks